May 17, 1927.  
R. WITKOVSKI  
1,629,059  
GREASE RETAINER  
Filed Feb. 11, 1926
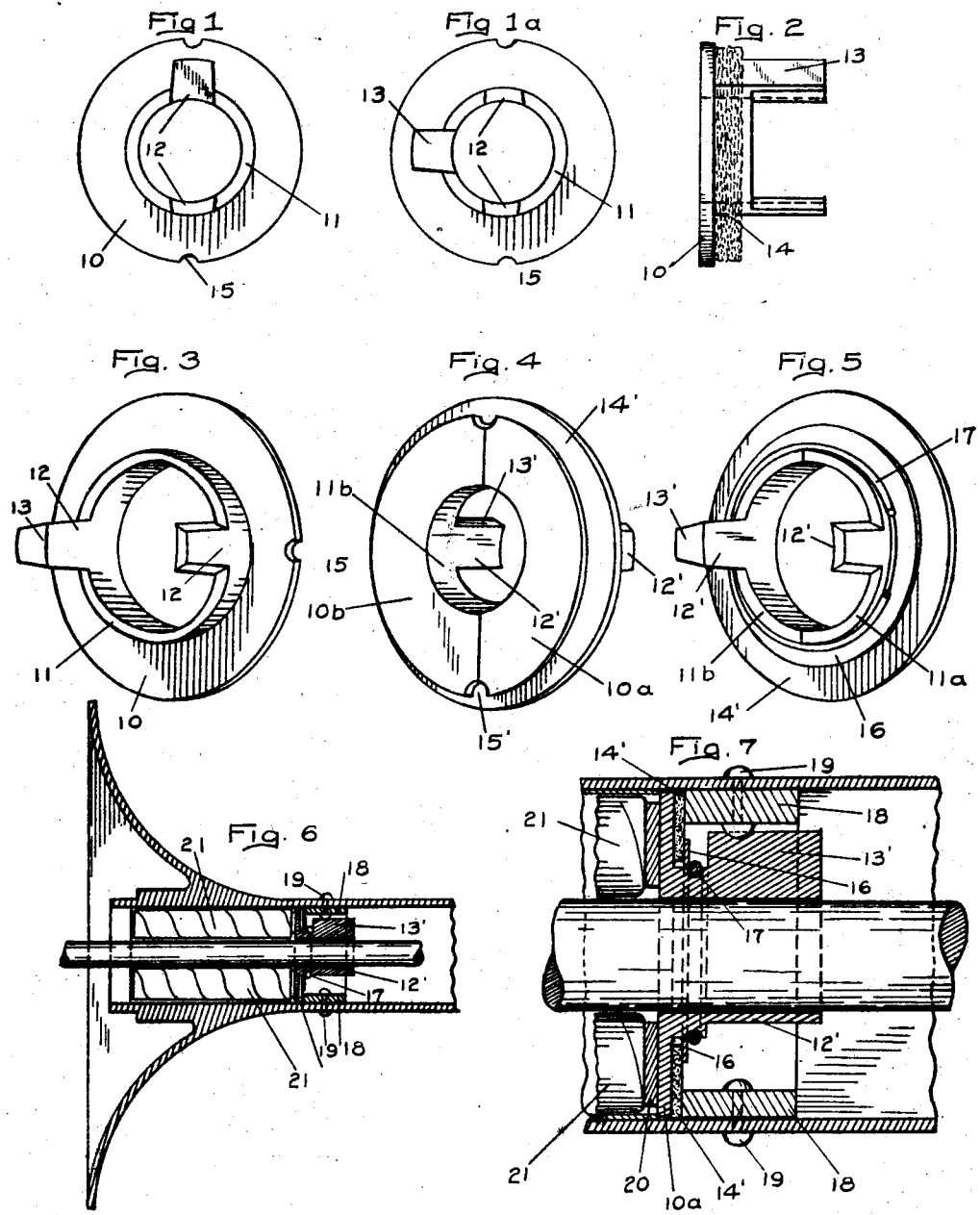
RUDOLPH WITKOVSKI INVENTOR.
BY Emiel F Lange
ATTORNEY Patented May 17, 1927.

1,629,059

UNITED STATES PATENT OFFICE.

RUDOLPH WITKOVSKI, OF BEATRICE, NEBRASKA.

GREASE RETAINER.

Application filed February 11, 1926. Serial No. 87,715.

My invention relates to grease retainers which have for their purpose the prevention of the leakage of lubricant from shaft and axle housings.

The leakage of grease from the rear axle housing of the Ford automobile is common to nearly all cars of that make. The lubricant is lost and wasted, and nothing gives a car an unsightly appearance more quickly than grease running from the rear axle. The unsightly and dangerous character of the grease on the garage floor, the deteriorating effect of the grease on the tires and rubber connections, and the dangerous lubricating effect of the grease on the brake bands all combine to make this a serious and expensive problem.

In brief, the object of the construction herein described and illustrated in my drawings is the provision of a simple device which may be easily placed in the rear axle housing of a Ford automobile to prevent the leakage of grease therefrom. The construction and operation of the device are, however, such as to adapt the device to other but similar uses on shafting of various kinds.

Referring now to my drawings,

Figure 1 is a face view of my grease retainer as seen from its inner side.

Figure 1ᵃ is a similar view of a slightly modified form of the same grease retainer.

Figure 2 is an edge view of the grease retainer.

Figure 3 is a view in perspective of the grease retainer with the felt washer omitted.

Figure 4 is a view in perspective of the assembled grease retainer of a modified and improved form.

Figure 5 is a perspective view of the grease retainer shown in Figure 4, the two figures showing the grease retainer as it appears when viewed from opposite sides.

Figure 6 is a median longitudinal sectional view of the rear axle housing of the Ford automobile with a grease retainer of my preferred form applied thereto.

Figure 7 is a view on an enlarged scale of a portion of the structure shown in Figure 4.

The grease retainer comprises an annular disc 10, an inner sleeve 11, a pair of diametrically opposed wipers 12, and a holdfast 13, used in combination with a felt washer 14. The parts 10, 11, 12, and 13 may be integral as shown or they may be built up or assembled. The holdfast 13 may be either integral with one of the wipers 12 as in Figure 1, or it may be spaced from both of the wipers as in Figure 1ᵃ.

The grease retainer is designed to be stationary on the rotating axle, and for this purpose the holdfast 13 is provided for engaging the inner heads of the housing rivets 19 of the rear axle housing. The wipers 12 have bevelled edges whereby during the rotation of the axle shaft the grease is wiped off by the stationary wipers. In order to facilitate removal of the grease retainer from the rear axle housing, notches 15 are formed in the periphery of the annular disc 10, the notches being preferably positioned opposite the wipers.

The grease retainer is designed initially and primarily for use on the Ford automobile and for this reason the parts must be constructed in dimensions which are related to those of the rear axle housing and the axle shaft of the Ford automobile. All parts of the grease retainer except the felt washer are made of steel or other suitable metal. The annular disc 10 has a diameter which is one-sixteenth inch less than the internal diameter of the axle housing. It is made smaller than the axle housing for the reason that as the automobile parts begin to wear there would be a tendency for the weight of the rear part of the edge of the disc 10 rather than on the roller bearings and to thus cause undue wear on the housing. The sleeve 11 has an internal diameter which is but slightly greater than the diameter of the axle shaft so that the axle shaft may rotate freely therein. The felt washer entirely surrounds the sleeve 11 and for this reason the holdfast 13 is cut short so that it does not contact with the annular disc 10.

The grease retainer as above described has been found to be admirably adapted for use in Ford automobiles of the older models, but certain changes in the later models of the automobile have necessitated certain changes in the grease retainer. These changes in the grease retainer are all shown in Figures 4 and 5, which figures illustrate the preferred form of my grease retainer. The grease retainer shown in Figures 4 and 5 has all of the essential characteristics of the grease retainer shown in Figures 1 to 3 but it possesses the advantage of being adapted for use in any or all models of the Ford automobile.

The rear axle shaft of the Ford automobile was formerly machined throughout its entire length but in the later models the machining is done only at the bearing portions of the shaft and slightly beyond. In consequence, the remainder of the shaft has a roughened or unfinished surface with a slightly greater diameter than that of the bearing portions of the shaft. The sleeve 11 must fit snugly on the smooth portion of the shaft adjacent the bearing and if it has the correct internal diameter, it will be found impossible to slip it over the unfinished end of the shaft. My preferred form of grease retainer is therefore made in two parts with a yieldable connection for permitting the spreading of the parts to slip them past the unfinished portions of the axle shaft.

As shown in Figures 4 and 5, the annular disc 10$^a$—10$^b$ and the inner sleeve 11$^a$—11$^b$ are each formed of two parts, the parts 10$^a$ and 11$^a$ and the parts 10$^b$ and 11$^b$ being integral. Each sleeve portion has secured thereto a wiper 12′, and the holdfast 13′ is integral with either of the wipers 12′. Instead of the felt washer, there is a compressed washer 14′ surrounding the collar 11$^a$—11$^b$. The washer 14′ is quite firm and rigid, but it is also reinforced by a metal washer 16 of somewhat less external diameter than the washer 14′. The sleeve portions 11$^a$ and 11$^b$ are provided with grooves in their exterior surfaces for seating the resilient ring 17 to securely but yieldingly clamp together the parts 10$^a$, 10$^b$, 11$^a$, 11$^b$, 14′, and 16. The washers 14′ and 16 have central apertures which are large enough to permit the washer 14′ to adjust itself automatically after installation of the grease retainer, but the external diameter of the washer 14′ is such that the edge of this washer will be flush against the inner wall of the axle housing.

The relationship of parts is best shown in Figures 6 and 7. In the rear axle housing of the Ford automobile the ring 18 is secured to the housing by means of the housing rivets 19, the ring 18 being designed to serve as an abutment for the axle shaft bearing retainer washer 20. In applying the grease retainer to the Ford automobile the bearings 21 and the washer 20 are first removed from the rear axle housing and the grease retainer is then shoved into place as shown in Figures 6 and 7, after which the washer 20 and the bearings 21 are reinserted in their original positions. The holdfast 13′ abuts against the inner head of a rivet 19 and thus prevents the rotation of the grease retainer. The rotating axle shaft is thus brushed by the stationary wipers 12′, so that any grease which creeps along the axle shaft is caught by the stationary wipers and is thus arrested in its outward movement.

In slipping the grease retainer onto the axle shaft the two-part construction of the grease retainer facilitates its passage over the unfinished parts of the axle shaft. The resilient ring 17 permits the spreading of the two parts but brings them together when seated so that they tightly encircle the axle shaft. In the later models of Ford automobiles the inner surface of the axle housing and both surfaces of the ring 18 are also left unfinished, which permits the grease to creep through the narrow space between the ring 18 and the axle housing. The compressed washer 14′ is seated with its edge flush against the inner wall of the axle housing as shown in Figure 7. The grease is thus stopped from further movement when it reaches the washer 14′. The joint adjacent the periphery of the washer is thus oil tight. All parts of the joint are stationary and there is no relative movement between them, so that there can be no wear at the edge of the washer 14′ or elsewhere which might later permit the creeping of oil through the joint. The snug but smooth fit between the axle shaft and the collar is such as to permit absolute freedom of movement of the axle shaft but to at the same time prevent any but the tiniest quantity of oil from creeping through. Even though the entire space within the axle housing were filled with lubricant in hot weather, so little of the lubricant will pass the grease retainer that none of it will reach the outside where it is wasted, and where it would gather dust and grit and become generally unsightly and mussy.

Having thus described my invention in such full, clear and exact terms that its construction and mode of operation will be readily understood by others skilled in the art to which it pertains, what I claim as new and desire to secure by Letters Patent of the United States is:—

1. A grease retainer comprising a collar having an annular flange at one end thereof, said collar and flange being in the form of two halves of substantially like dimensions, wipers projecting from said collar and in alignment therewith, a composition washer loosely surrounding said collar and bearing against said annular flange, a rigid washer snugly encircling said collar and bearing against said composition washer, and a resilient ring surrounding said collar and bearing against said rigid washer to hold the two parts of said collar and flange in assembled relation with said composition washer and said rigid washer.

2. A grease retainer adapted to surround a shaft within a housing, the housing having a ring riveted thereto and against its inner wall with the rivet heads protruding inwardly therefrom, said grease retainer comprising a flanged collar which is adapted to surround the shaft, the flange of said collar having a diameter which is substantially equal to the inner diameter of the housing, a washer loosely positioned on said collar and extending to the inner wall of the housing, a second washer of lesser diameter than the first said collar and snugly encircling the shaft and bearing against the first said collar, wipers on said collar for dislodging lubricant from the shaft during the rotation of the shaft, said wipers having bevelled edges, a holdfast on said collar for preventing the rotation thereof, said holdfast being adapted to engage the protruding head of a rivet, said collar with its flange being in the form of two halves of substantially equal size and being provided with an annular groove adjacent said second washer, and a resilient ring seated in the groove and surrounding said collar, said ring holding the parts of said grease retainer in assembled relation but permitting a slight separation of the two halves of the grease retainer when positioning it on the shaft.

In witness whereof I affix my signature.

RUDOLPH WITKOVSKI.